(12) United States Patent
Cornec et al.

(10) Patent No.: US 7,113,149 B2
(45) Date of Patent: Sep. 26, 2006

(54) APPARATUS AND METHOD FOR CLAMPING CABLES IN AN ANTENNA

(75) Inventors: David Cornec, Hengoat (FR); Damien LeGrand, Lanrivoare (FR)

(73) Assignee: Radio Frequency Systems, Inc., Meriden, CT (US)

( * ) Notice: Subject to any disclaimer, the term of this patent is extended or adjusted under 35 U.S.C. 154(b) by 0 days.

(21) Appl. No.: 10/913,348

(22) Filed: Aug. 9, 2004

(65) Prior Publication Data

US 2005/0068250 A1    Mar. 31, 2005

Related U.S. Application Data

(60) Provisional application No. 60/505,620, filed on Sep. 25, 2003.

(51) Int. Cl.
*H01Q 1/50*    (2006.01)

(52) U.S. Cl. ........................... 343/906; 343/702
(58) Field of Classification Search ............... 343/906, 343/702
See application file for complete search history.

(56) References Cited

U.S. PATENT DOCUMENTS

| | | | |
|---|---|---|---|
| 3,944,722 A | 3/1976 | Larsen | |
| 4,063,246 A | 12/1977 | Greiser | |
| 4,170,013 A | 10/1979 | Black | |
| 4,222,056 A * | 9/1980 | Graeser et al. ............. | 343/767 |
| 5,357,223 A * | 10/1994 | Forgeot ........................ | 333/26 |
| 5,402,136 A * | 3/1995 | Goto et al. ................. | 343/729 |
| 5,532,703 A | 7/1996 | Stephens et al. | |
| 5,809,135 A | 9/1998 | Chang | |
| 5,819,163 A | 10/1998 | Tsukamoto et al. | |
| 5,877,729 A * | 3/1999 | Holloway et al. .......... | 343/767 |
| 5,880,696 A | 3/1999 | Koleda | |
| 6,049,314 A * | 4/2000 | Munson et al. ............. | 343/846 |
| 6,133,883 A | 10/2000 | Munson et al. | |
| 6,292,154 B1 * | 9/2001 | Deguchi et al. ............ | 343/806 |
| 6,339,401 B1 | 1/2002 | Oshiyama | |
| 6,384,788 B1 | 5/2002 | Pretorius et al. | |
| 6,850,207 B1 * | 2/2005 | Chen .......................... | 343/878 |

* cited by examiner

*Primary Examiner*—Tho Phan
(74) *Attorney, Agent, or Firm*—Sughrue Mion; TThomas C. Gellenthien; V. Lawrence Sewell

(57) ABSTRACT

An antenna including a metallic reflector; a radiating element disposed on the reflector; a metallic power divider disposed on the reflector; a coaxial cable interconnecting the power divider to the radiating element; and a clamp for clamping the coaxial cable to the reflector or the power divider, wherein the clamp is unitary with the reflector or the power divider. There may be multiple clamps for clamping the cable to both the reflector and the power divider as necessary to secure the cable in place. Also, there may be a plurality of coaxial cables. The clamp includes a metallic plate having an opening for receiving the coaxial cable. The opening is preferably stamped in the metallic plate. The opening is preferably substantially U-shaped and the coaxial cable is frictionally retained in the opening by a press fit. More specifically, the clamp includes opposing leg portions and a base portion which define the opening. The opening includes a substantially circular cross-section defined by the base portion and a lower end of the leg portions and a substantially V-shape tapered portion defined by an upper end of the leg portions.

17 Claims, 4 Drawing Sheets

APPARATUS AND METHOD FOR CLAMPING CABLES IN AN ANTENNA

The application claims benefit of Provisional Application Ser. No. 60/505,620, filed Sep. 25, 2003; the disclosure of which is incorporated herein by reference.

BACKGROUND OF THE INVENTION

The invention is directed to an apparatus and method for clamping cables in an antenna.

A conventional antenna for a mobile phone communications network includes a metallic reflector which is used to secure other components of the antenna such as radiating elements, connectors and a power divider using stripline technology. The various electrical components are electrically connected to each other using coaxial cable which includes an inner conductor, a dielectric insulator, a metallic braid and an outer jacket. Conventionally, the inner conductor and the metallic braid are electrically connected to the electrical components by a soldering process. To ensure that the soldered connections are not broken, it is necessary to firmly retain the coaxial cable to the various components, such as the reflector or the power divider.

A related assembly arrangement includes external clamps which are secured to the reflector to hold the coaxial cable to the reflector before the inner conductor and the metallic braid are soldered. The problem with this arrangement is that it is time consuming to individually attach the clamps to the reflector. Also, the cable cannot be precisely located to guarantee a good electrical connection.

A second related assembly arrangement involves making a subassembly by soldering the braid to a metal block. This subassembly is made outside the main assembly line. On the assembly line, this subassembly is fixed mechanically on the reflector by screwing the block to the reflector. The problem with this arrangement is the increased cost of the block and the extra assembly steps.

SUMMARY OF THE INVENTION

A first embodiment of the invention is directed to an antenna, comprising a metallic reflector; a radiating element disposed on the reflector; a metallic power divider disposed on the reflector; a coaxial cable interconnecting the power divider to the radiating element; and a clamp for clamping the coaxial cable to the reflector or the power divider, wherein the clamp is unitary with the reflector or the power divider. Of course, in the preferred embodiment there are multiple clamps for clamping the cable to both the reflector and the power divider as necessary to secure the cable in place. Also, there may be a plurality of coaxial cables.

The clamp includes a metallic plate, which is part of the reflector or power divider, having an opening for receiving the coaxial cable. The opening is preferably stamped in the metallic plate. The opening is preferably substantially U-shaped and the coaxial cable is frictionally retained in the opening. More specifically, the clamp includes opposing leg portions and a base portion which define the opening. The opening includes a substantially circular cross-section defined by the base portion and a lower end of the leg portions and a substantially V-shape tapered portion defined by an upper end of the leg portions. In this way the cable can easily be pressed into the circular opening via the tapered upper portion. Also, the clamp may include a plurality of openings such that the clamp can receive a plurality of coaxial cables.

In addition, an end a clamp, may be provided to clamp the metallic braid of the cable at the end where the outer jacket has been removed. The metallic braid can then be soldered to the end clamp.

According to another embodiment, the invention is directed to a clamp for clamping the cable to a metallic element of the antenna, such as the reflector or power divider, where the clamp has the construction described above. Still further, the invention is directed to a method of clamping the cable to an antenna using a metallic portion of the antenna such as the reflector or power divider, whereby a clamp is formed by stamping the metallic portion to form a substantially U-shaped clamping portion described above. In this way, the clamping portion is unitary with the antenna.

Other features and advantages of the invention will be apparent from the following description, the accompanying drawings and the appended claims.

DETAILED DESCRIPTION OF THE INVENTION

Figure 1:
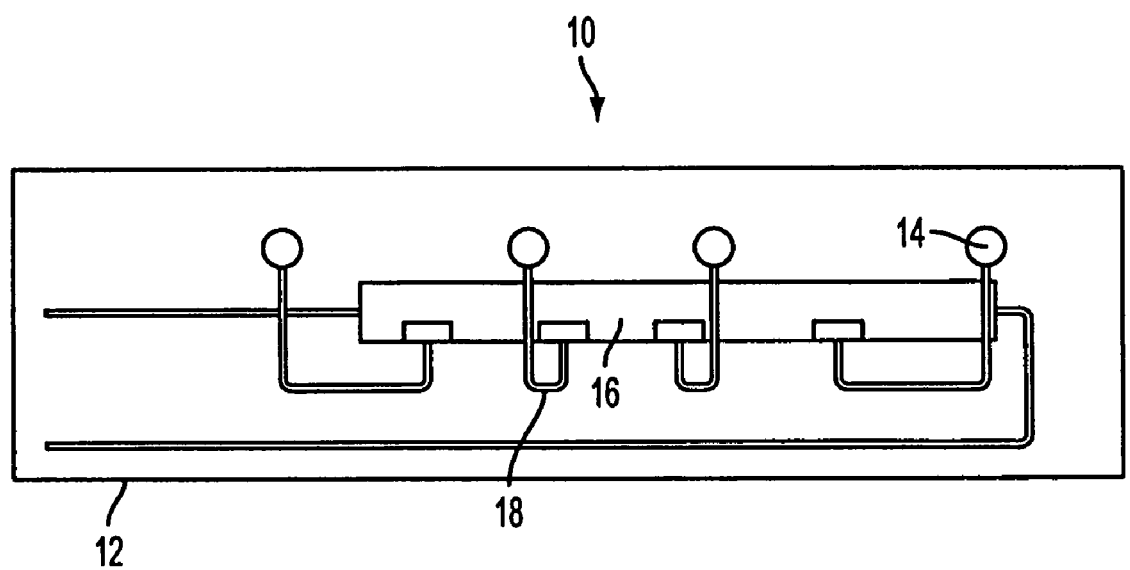
FIG. 1 is a schematic view of a feed network of an antenna.
Figure 4A:
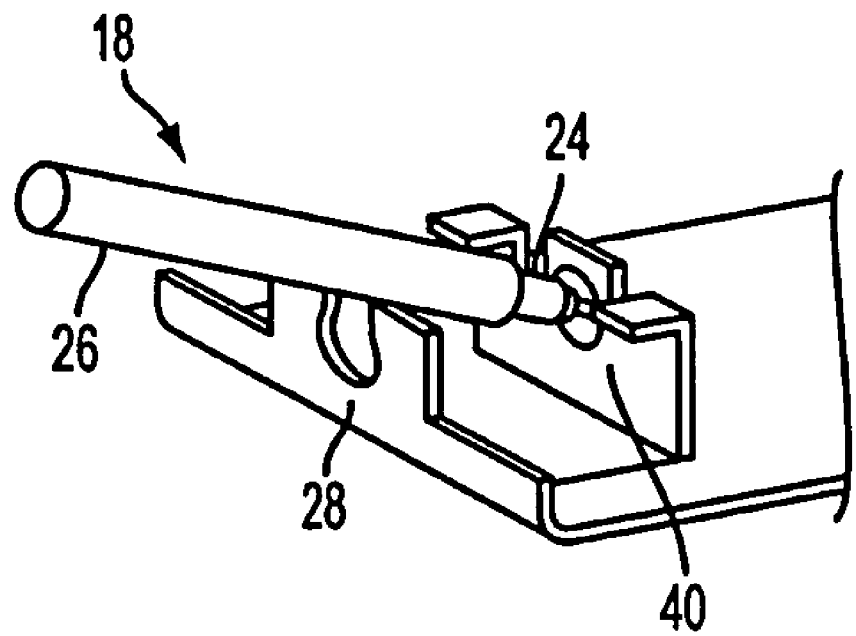
FIGS. 4(a) and 4(b) are schematic illustrations showing a technique for connecting the cable to the clamps of the present invention.

FIG. 1 illustrates the feed network 10 of the antenna according to an embodiment of the invention. The feed network 10 includes a metallic reflector 12, a plurality of radiating elements 14, a power divider 16 and a plurality of coaxial cables 18. The coaxial cables are conventional and include a center conductor 20, a dielectric insulator 22, a metallic braid 24 and an insulating jacket 26 (FIG. 4(a)). The coaxial cables electrically interconnect the various electrical components of the invention. For example, there are feed cables to and from the power divider 16 as well as cables interconnecting the power divider 16 and the radiating elements 14.

Figure 2:
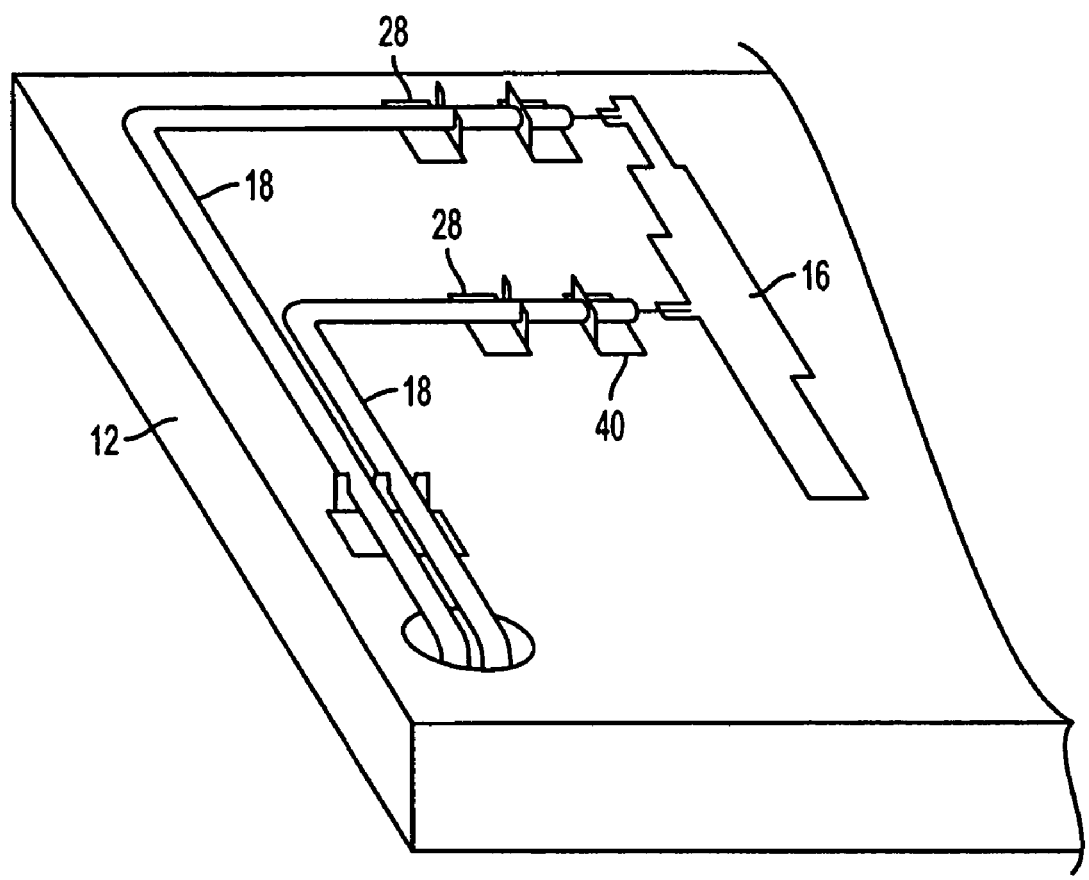
FIG. 2 is a perspective view showing the feed network of an antenna with the inventive clamping arrangement.
Figure 3:
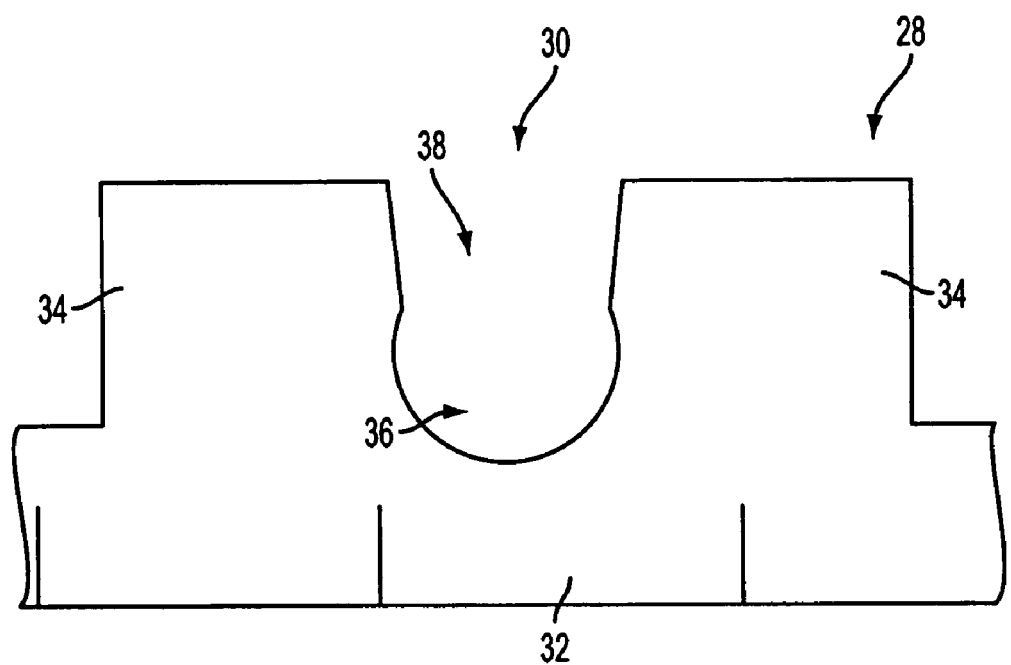
FIG. 3 is a side view showing the metallic clamp of the present invention.

As shown in FIG. 2, according to a preferred embodiment, a clamp 28 is provided for clamping the coaxial cable to the antenna. The clamp 28 is unitary (i.e., one-piece) with the metallic reflector 12. More specifically, according to the invention, the metallic reflector is stamped to form the clamp which extends upwardly from the face of the reflector. The clamp 28 is shown in detail in FIG. 3. The clamp includes a substantially U-shaped opening 30, defined by a base portion 32 and opposing leg portions 34, for receiving the cable 18. The width of the opening is dimensioned so that the cable is firmly received in the opening and held by the opposing leg portions 34. In the preferred embodiment, the opening has a lower portion 36 with a circular cross section and an upper portion 38 defining a substantially V-shaped tapered portion. The V-shaped upper portion 38 allows the cable to be pressed into the opening until it is firmly received in the circular lower portion 36.

The clamps 28 are preferably provided in areas of the reflector where the cables are required to be retained. For example, in the embodiment illustrated in FIG. 2, there are a plurality of clamps 28, some of which are located at the end of the cable to properly position the end of the cable and some of which are located along the length of the cable. Once the cable is positioned in the clamps on the reflector, the center conductor 20 and metallic braid 24 can be soldered to the appropriate part. In the example shown in FIG. 2, the conductor 20 is soldered to the power divider 16 and the metallic braid 24 is soldered to the reflector, either directly or via a clamp.

Figure 4B:
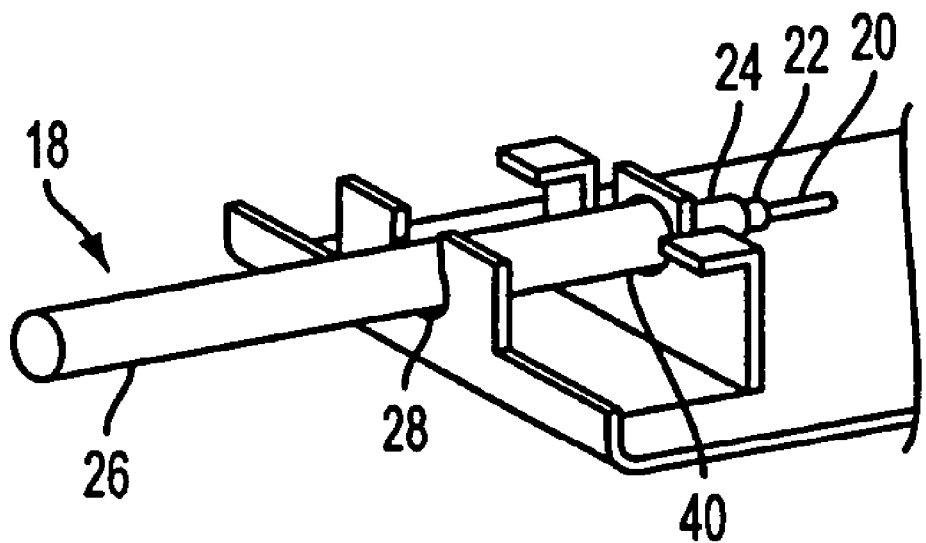

More specifically, an end clamp 40 may be provided for clamping the distal end of the cable where the outer insulating jacket 26 has been stripped to expose the metallic braid 24. In this way, the metallic braid is firmly retained by the metallic end clamp 40 such that the cable is grounded to the metallic reflector 12. After the cable has been positioned in the clamp, the metallic braid 24 is preferably soldered to the end clamp 40. The end clamp 40 can have the same basic design as the other clamp 28 including the U-shaped opening 30. Alternatively, the end clamp 40 can simply have a circular opening into which the end of the cable is inserted, as shown in FIGS. 4(*a*) and 4(*b*). In this case it is preferable to include clamp 28 having the U-shaped opening 30 adjacent the end clamp 40 so that the end of the cable can be firmly held in place.

While the invention has been described with the clamps 28 and 40 unitarily provided in the metallic reflector, the invention is not limited in this regard. For example, the clamps could alternatively, or additionally, be provided in other parts of an antenna that are metallic, such as the power divider 16. Also, although the clamps have been described above with a specific design, the invention is not limited in the particular shape of the clamps. In addition, although the clamp has been described as having a single opening, each clamp may have more than one opening for retaining multiple cables.

According to the invention, the process for securing the cables to the antenna and for soldering the center conductor 20 and metallic braid 24 is very efficient. More specifically, the cables can be clamped in place by simply inserting them into the clamps without using external parts, by providing the clamps unitary with other metallic parts of the antenna such as the metallic reflector 12 or strip line power divider 16. In this way, the clamping portion is unitary with the antenna. Thus, in one operation the cables can be positioned for soldering. In addition, the cables are firmly retained so that they do not experience undesirable bending. Further, the clamps can be easily formed by a conventional punching operation, or the like. The design allows for improved positioning and fixing of the cables, and easy assembly at a reduced cost both in the form of manpower and materials.

Having illustrated and described preferred embodiments of the invention, it should be apparent to those skilled in the art that the same permits of modification in arrangement and detail. The invention is intended to cover all such modifications that come within the spirit and scope of the following claims.

What is claimed is:

1. An antenna, comprising:
a metallic reflector;
a radiating element disposed on said reflector;
a metallic power divider; and
a coaxial cable electrically connected to at least one of the power divider and the radiating element; and
a clamp for clamping an insulated portion of the coaxial cable to at least one of the reflector and the power divider, wherein said clamp is unitary with said at least one of the reflector and the power divider.

2. The antenna of claim 1, wherein said clamp includes a metallic plate having an opening for receiving the coaxial cable.

3. The antenna of claim 2, wherein said opening is stamped in said metallic plate.

4. The antenna of claim 2, wherein said opening is substantially U-shaped and said coaxial cable is frictionally retained in said opening.

5. The antenna of claim 4, wherein said clamp includes opposing leg portions and a base portion which define said opening, and wherein said opening includes a substantially circular cross-section defined by said base portion and a lower end of said leg portions and a substantially V-shape tapered portion defined by an upper end of said leg portions.

6. The antenna of claim 2, wherein said clamp includes a plurality of openings such that said clamp can receive a plurality of coaxial cables.

7. The antenna of claim 2, further comprising an end clamp that is unitary with said at least one of the reflector and the power divider, wherein said end clamp includes a second opening which clamps a braided ground portion of said coaxial cable.

8. A clamp for clamping an insulated portion of a coaxial cable in an antenna having a reflector and a power divider made of metal, said clamp comprising a clamping element which is unitary with at least one of said reflector and said power divider.

9. The clamp of claim 8, wherein said clamping element includes a metallic plate having an opening for receiving the coaxial cable.

10. The clamp of claim 9, wherein said opening is stamped in said metallic plate.

11. The clamp of claim 9 wherein said opening is substantially U-shaped and said coaxial cable is frictionally retained said opening.

12. The clamp of claim 11, wherein said clamp includes opposing leg portions and a base portion which define said opening, and wherein said opening includes a substantially circular cross-section defined by said base portion and a lower end of said leg portions and a substantially v-shape tapered portion defined by an upper end of said leg portions.

13. The clamp of claim 9, wherein said clamping element includes a plurality of openings such that said clamping element can receive a plurality of coaxial cables.

14. The clamp of claim 9, further comprising an end clamp that is unitary with at least one of said reflector and said power divider, wherein said end clamp includes a second opening which clamps a braided ground portion of said coaxial cable.

15. A method of securing a coaxial cable to an antenna having at least one metallic element performing an electrical function for the antenna, comprising the following steps:
forming a clamping portion in said metallic element, said clamping portion having an opening which is dimensioned to firmly receive and retain an insulated portion of said coaxial cable; and
inserting the insulated portion of said coaxial cable in said opening,
wherein said metallic element is a power divider.

16. The method of claim 15, further comprising the step of soldering a center conductor of said coaxial cable to the antenna.

17. The method of claim 15, wherein said forming step comprises stamping said metallic element to form said clamping portion.

* * * * *